United States Patent
Cole et al.

(10) Patent No.: US 11,044,918 B2
(45) Date of Patent: Jun. 29, 2021

(54) PIZZA DOUGH COMPRISING MALTED BARLEY FLOUR

(71) Applicant: SOCIÉTÉ DES PRODUITS NESTLÉ S.A., Vevey (CH)

(72) Inventors: Frank Arthur Cole, Glenview, IL (US); James Christian Studtmann, Chicago, IL (US); Jeremy Hardwick, Highland Park, IL (US)

(73) Assignee: Societe des Produits Nestle S.A., Vevey (CH)

(*) Notice: Subject to any disclaimer, the term of this patent is extended or adjusted under 35 U.S.C. 154(b) by 1022 days.

(21) Appl. No.: 14/367,656

(22) PCT Filed: Nov. 30, 2012

(86) PCT No.: PCT/EP2012/074179
§ 371 (c)(1),
(2) Date: Jun. 20, 2014

(87) PCT Pub. No.: WO2013/092176
PCT Pub. Date: Jun. 27, 2013

(65) Prior Publication Data
US 2014/0308395 A1    Oct. 16, 2014

Related U.S. Application Data

(60) Provisional application No. 61/578,574, filed on Dec. 21, 2011.

(51) Int. Cl.
*A21D 13/41* (2017.01)
*A21D 2/38* (2006.01)
*A21D 8/04* (2006.01)

(52) U.S. Cl.
CPC .............. *A21D 13/41* (2017.01); *A21D 2/38* (2013.01); *A21D 8/042* (2013.01)

(58) Field of Classification Search
CPC .............................. A21D 13/007; A21D 2/38
(Continued)

(56) References Cited

U.S. PATENT DOCUMENTS 3,615,679 A    10/1971    Tangel et al.
5,074,778 A *  12/1991    Betts, Jr. .............. A21C 11/006
                                                         425/383

(Continued)

FOREIGN PATENT DOCUMENTS

DE    3224533    1/1984
EP    0554926    8/1993

(Continued)

OTHER PUBLICATIONS

"Briess Products—Malt Ingredietns/Diastatic Malt Flours". Available online at www.briess.com on Mar. 21, 2009.*

(Continued)

*Primary Examiner* — Erik Kashnikow
*Assistant Examiner* — Assaf Zilbering
(74) *Attorney, Agent, or Firm* — K&L Gates LLP

(57) ABSTRACT

The present disclosure relates to food products having a dough component with a unique appearance and texture. The food product may be a pizza product. In a general embodiment, the dough component of the food product includes malted barley flour in an amount greater than 1% to about 3%, which helps to create and maintain the unique appearance and texture of the food product. Methods for making a dough-based food product are also provided and include mixing a dough having malted barley flour in an amount from about 0.5% to about 3.0%, fermenting the dough, pressing the dough with a die having unique characteristics, and baking the dough to form a baked dough.

9 Claims, 3 Drawing Sheets

(58) Field of Classification Search
USPC .................................................. 426/18, 549
See application file for complete search history.

(56) References Cited

U.S. PATENT DOCUMENTS

2004/0213883 A1   10/2004   Sadek et al.
2006/0188630 A1    8/2006   Rettey

FOREIGN PATENT DOCUMENTS

| EP | 0691078 |      | 1/1996 |           |
|----|---------|------|--------|-----------|
| EP | 0691078 | A2 * | 1/1996 | A21D 8/04 |
| EP | 1219174 |      | 7/2002 |           |
| EP | 1647191 |      | 4/2006 |           |
| FR | 2431258 |      | 2/1980 |           |
| RU | 2340188 |      | 12/2008 |          |
| WO | 9220234 |      | 11/1992 |          |
| WO | WO2004037003 | | 5/2004 |           |

OTHER PUBLICATIONS

"Maled Barley Flour". Available online at www.cooksinfo.com on Jul. 13, 2007.*
"Cara Amico" Available online at www.burgersdogspizza.com on Dec. 14, 2010.*
"Malted Barley Flour" Available online at www.cooksinfo.com on Jul. 13, 2007.*
Figoni, Paula, "How Baking Works, Exploring the Fundamental of Baking Science" Second Edition Flour and Dough Additives and Treatments pp. 75-76—Cover Sheet.
European Office Action—Appl. No. 12 791 821.7-1375 dated Apr. 12, 2017—2 pages.

* cited by examiner

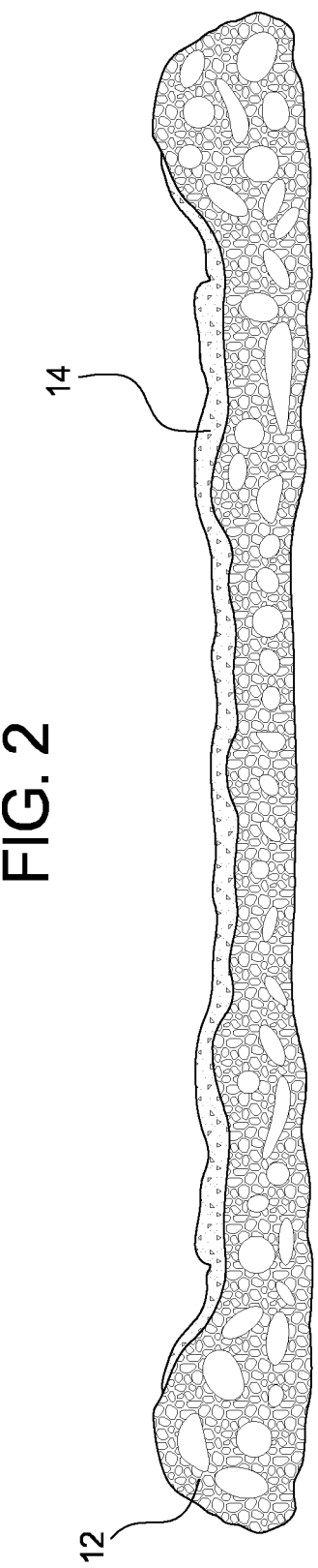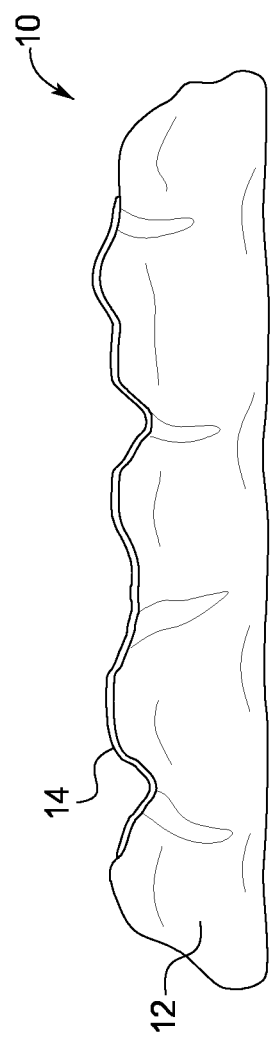

PIZZA DOUGH COMPRISING MALTED BARLEY FLOUR

CROSS REFERENCE TO RELATED APPLICATIONS

The present application is a National Stage of International Application No. PCT/EP2012/074179, filed on Nov. 30, 2012, which claims priority to U.S. Provisional Patent Application No. 61/578,574, filed Dec. 21, 2011, the entire contents of which are being incorporated herein by reference.

BACKGROUND

The present disclosure relates generally to food technologies. More specifically, the present disclosure relates to food products having a hand-made, irregular, and textured appearance, and methods for making same.

Frozen pizza products have been marketed in the United States since at least the 1950's. Since the introduction of frozen pizzas, the ingredients and processes used to manufacture frozen pizzas have become more standardized and automated, with small differences between brands. These differences may be apparent in dough formulations, sauce formulations, processing parameters, etc., but most frozen pizzas on the market are generally circular in shape and have a substantially uniform crust diameter, rim height and density. These characteristics may indicate that an automated, mass-manufactured process was used to produce the pizzas, which may be less appealing to consumers who prefer products that appear to be hand-made from high quality ingredients.

However, hand-made products, or products made in very small batches, are neither time- nor cost-effective to manufacture. Indeed, in order to be competitive in the market for frozen pizzas, manufacturers must be able to provide a good-tasting product that is aesthetically appealing to consumers and that can be manufactured at low cost (e.g., using high-speed, automated manufacturing processes). Therefore, a need exists for a frozen pizza that has an appearance and texture that is suggestive of a high-quality, hand-made pizza, but that can be manufactured rapidly and at a low cost.

SUMMARY

The present disclosure provides dough-based food products and methods for making same. The dough-based food products may be pizza products such as, for example, frozen pizza products. In an embodiment, a pizza dough is provided and includes malted barley flour in an amount greater than 1.0% to about 3% by flour weight.

In an embodiment, the pizza dough includes malted barley flour in an amount from about 1.5% to about 2.5% by flour weight.

In an embodiment, the pizza dough includes malted barley flour in an amount of about 1.5% by flour weight.

In an embodiment, the pizza dough further includes at least one ingredient selected from the group consisting of flour, water, salt, sugar, yeast, or combinations thereof.

In another embodiment, a pizza product is provided and includes a dough comprising malted barley flour in an amount greater than 1.0% to about 3% by flour weight of the dough product, the dough having a characteristic selected from the group consisting of a regular shape, an irregular shape, an uneven topography around an outer, top portion of the dough, an open cell structure, or combinations thereof. The pizza product may also include at least one topping on the dough.

In an embodiment, the pizza product includes malted barley flour in an amount from about 1.5% to about 2.5% by flour weight.

In an embodiment, the dough includes malted barley flour in an amount of about 1.5%.

In an embodiment, the dough further comprises at least one ingredient selected from the group consisting of flour, water, salt, sugar, yeast, oil, or combinations thereof.

In an embodiment, the at least one topping is selected from the group consisting of a sauce, a cheese, a vegetable, a meat, a fruit, a seafood, an herb, a spice, a nut, or combinations thereof.

In an embodiment, the pizza product is a frozen pizza.

In yet another embodiment, a method of making a dough-based food product is provided. The method includes mixing a dough having malted barley flour in an amount greater than 0.5% to about 3.0% by flour weight, fermenting the dough, pressing the dough with a die having a characteristic selected from the group consisting a regular shape, an irregular shape, a channel formed along a bottom perimeter of the die, or combinations thereof, and baking the dough to form the dough-based food product.

In an embodiment, the dough includes malted barley flour in an amount from about 1.5% to about 2.5% by flour weight.

In an embodiment, the method further includes adding at least one topping to the pressed dough, the topping selected from the group consisting of a sauce, a cheese, a vegetable, a meat, a fruit, a seafood, an herb, a spice, a nut, or combinations thereof.

In an embodiment, the dough is fermented for an amount of time from about 60 minutes to about 120 minutes. The dough may be fermented for about 90 minutes.

In an embodiment, the dough is baked at an oven temperature from about 550° F. to about 800° F. The dough may be baked at an oven temperature of about 600° F. The dough may also be baked at an oven temperature of about 700° F.

In an embodiment, the method further includes at least one step selected from the group consisting of sizing the dough into a dough billet after fermenting the dough, proofing the dough after sizing the dough, applying a dusting flour to the dough after pressing the dough, packaging the dough-based food product, or combinations thereof.

In an embodiment, the irregular shape is selected from the group consisting of an irregular circle, an irregular oval, an irregular square, an irregular rectangle, or combinations thereof.

In an embodiment, the dough-based product has an irregular shape and an open cell structure.

In an embodiment, the dough-based food product is a frozen pizza product.

In yet another embodiment, a method of making a dough-based food product is provided. The method includes preparing a dough having malted barley flour, fermenting the dough for an amount of time that is less than three hours, pressing the dough with a die having a characteristic selected from the group consisting a regular shape, an irregular shape, a channel formed along a bottom perimeter of the die, or combinations thereof, and baking the dough to form the dough-based food product.

The skilled artisan will appreciate that any combination of claims and/or embodiments disclosed herein are supported by the present disclosure and that the subject matter disclosed herein should not be limited to the claims as filed.

Additional features and advantages are described herein, and will be apparent from the following Detailed Description and the figures.

BRIEF DESCRIPTION OF THE FIGURES

FIG. 2 shows a cross-section of the pizza product of FIG. 1 along line II-II in accordance with an embodiment of the present disclosure.

FIG. 3 shows a side view of the pizza product of FIG. 1 in accordance with an embodiment of the present disclosure.

DETAILED DESCRIPTION

Figure 1:
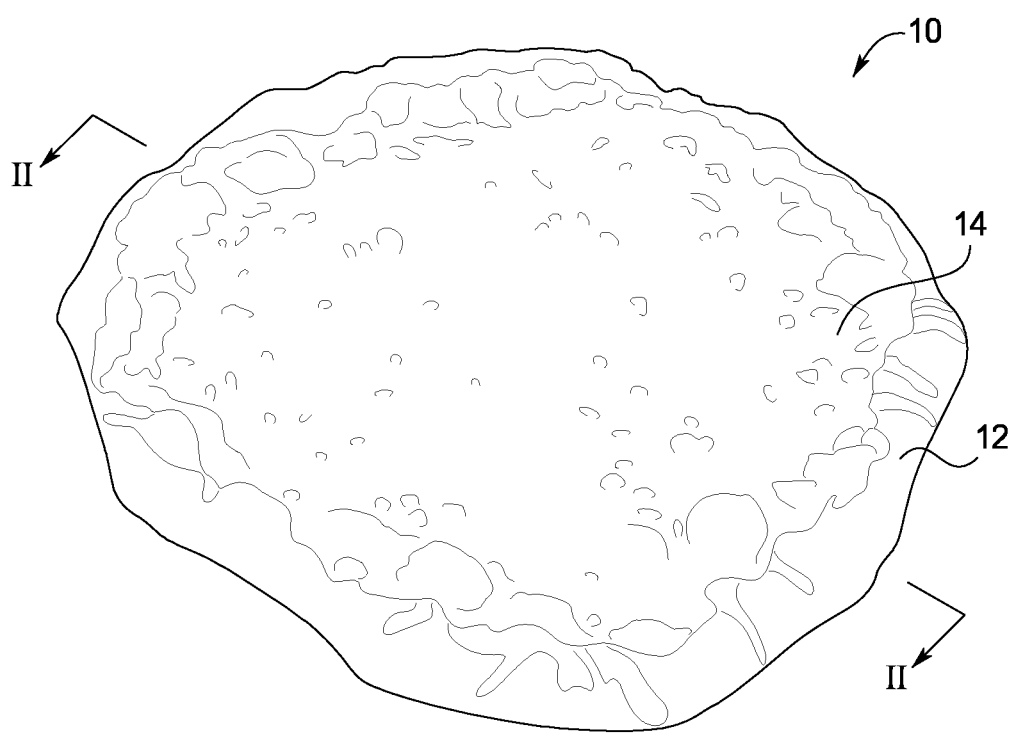
FIG. 1 shows a perspective view of a pizza product in accordance with an embodiment of the present disclosure.

This application is related to and incorporates by reference, commonly assigned, co-pending U.S. application Ser. No. 61/578,581 entitled, "DOUGH PRODUCTS HAVING AN OPEN-CELL TRUCTURE AND METHODS FOR MAKING SAME."

In a general embodiment, a dough-based product is provided that includes malted barley flour and has a unique shape and texture. In an embodiment, the dough-based product is a pizza product that may be a frozen pizza product. The products of the present disclosure utilize the combination of a unique dough formula and a unique process to create a product that is rustic in appearance, has a unique bread flavor, and has unique texture attributes. Each pizza product does not appear to be an exact duplicate of another and provides variation between each pizza product. These types of attributes are generally typical of dough that is minimally processed and that requires an extended fermentation time period. A product with these attributes has not been identified in the market using a high-speed, automated manufacturing process.

An "artisan" food product may be understood by the skilled artisan as including high-quality ingredients that may be locally sourced, and wherein the product may be hand-made in small batches. In this respect, an artisan pizza is typically categorized as having a non-uniform shape with variance in texture and appearance. This is typically achieved by hand-stretching dough one piece at a time. Generally, the flavor, appearance, and texture of artisanal pizza is achieved using fermentation periods in excess of three hours. Indeed, development of an artisan pizza by typical processing methods requires long dough fermentation times for flavor and texture development, space requirements and equipment for managing long fermentation times, and a unique oven such as, for example, a hearth-stone oven, with extreme temperatures to create a rustic appearance. Such processes, however, are not appropriate for producing mass-manufactured pizzas because hand-stretching techniques, long fermentation times, and use of specialty ovens are neither cost-nor time-efficient for large-scale production of pizzas.

Applicants have found, however, that the combination of a unique dough formulation and an automated process using a special die press plate creates a finished frozen pizza that possesses the characteristics of a pizza that would otherwise require a much longer process and more intricate processing equipment. The processes used for making the present "artisan pizzas" create a pizza that is non-uniform despite the use of high speeds and automation.

More specifically, the present products and methods include the use of malted barley flour with high enzymatic activity in the dough formula at a rate that is much higher than typically used in the baking industry. This ingredient in conjunction with a 60 to 120 minute, or 90 minute resting period creates dough that is possible to process using industrial manufacturing equipment. The dough formulations of the present disclosure provide advantages over known dough formulations, in part, because the amount of malted barley flour included in the present dough formulations is outside the level recommended by the baking industry. While it is common for pizza dough to contain malted barley flour at levels below 0.5% (by weight flour basis) to improve the functionality of the pizza dough and aid in manufacture, Applicants believe that there currently exists no product on the market that incorporates malted barley flour outside of the levels recommended by the malt and baking industries (e.g., typically 0-1.0%). Indeed, Applicants also believe that there currently exits no means by which to consistently create an irregular, artisan-type pizza in a time- and cost-efficient manner. The use of malted barley flour at this level aids in supplementing the enzymes present in flour to condition the dough through improved fermentation and starch pasting. Using levels higher than the 0-1.0% is typically avoided as it can have a reverse affect on dough functionality causing unwanted dough characteristics such as, for example, softness and gumminess, which make the dough difficult to process.

Further, the dough formulations of the present disclosure include diastatic malted barley as an enzyme source, which aids in improving flour quality. The additional enzymatic activity offered by the malted barley flour also assists in breaking down starch to provide sugar for yeast fermentation, which provides benefits including, for example, improved color, flavor, dough flow processing, and volume. Accordingly, when baked, the dough formulations of the present disclosure exhibit toasted characteristics similar to those of premium baked, hand-formed crusts. Indeed, the baked crust exhibits an interior crumb that has expanded and raised, thereby providing a soft, bready interior compared to the more typical, dense crumb of a par-baked crust. The malted barley flour further helps the dough to retain a given shape (e.g., a regular, circular shape, or an irregular, circular shape) and an uneven crust topography, or rim height, once the dough is shaped. This is important because certain dough formulations have a tendency to lose shape and revert back to, or spring back to, a shape that is not desired.

The dough of the present disclosure may be pressed during processing using a die press that creates a regular shape. Alternatively, the dough of the present disclosure may be pressed during processing using a unique die press that creates an inconsistent or irregular shape of pizza that allows for finished product variations despite the use of a high-speed, automated process. As used here, a "regular shape" means a shape that is substantially a geometric shape such as, for example, a circle, a square, a rectangle, an oval, etc. As used herein, "irregular shape" means a shape that is suggestive of a typical geometric shape (e.g., a circle, a square, a rectangle, an oval, etc.), but lacks symmetry such that the shape has imperfect and irregular lines, as will be discussed further below. The shape of the pizza in conjunction with the dough formula and process of manufacture allow the pizza to be par-baked in a typical impingement oven and still obtain rustic finished product qualities similar to pizzas baked in very high-heat hearth-style ovens and/or created by manual means.

Additionally, die press plates of the present disclosure may be used to press dough portions of the present products to help create an irregular topography in the crust portion, or outer rim portion of the dough-based products that allows for finished product variation despite the use of a high-speed, automated process. As used herein, an "irregular topography" means that the crust portion of the present dough-based products can have an uneven, or irregular height around the circumference of the products as measured from the bottom of the product. In an embodiment wherein a dough-based product of the present disclosure includes uneven or inconsistent crust topography, the dough-based product may or may not also have an irregular shape as discussed above. For example, a dough-based product of the present disclosure may have an irregular shape with an even crust topography, or an irregular shape and an uneven or inconsistent crust topography, or a regular shape and an uneven or inconsistent crust topography. Accordingly, the benefits provided by the present products over known frozen pizzas is that it would allow the fast-paced, large-scale production of a frozen pizza possessing the aforementioned attributes of an artisan style pizza typical of pizzerias.

Referring now to the figures and, in particular, to FIG. 1, a dough-based product 10 is provided. As shown in FIG. 1, dough-based product 10 may be a pizza product that includes a crust portion 12 and at least one topping 14. The skilled artisan will appreciate, however, that topping 14 need not be included and dough-based product 10 need not be a pizza product. In such an embodiment, dough-based product 10 may be focaccia-type bread product that is designed to be eaten alone or with other condiments or dips such as, for example, hummus, dressings, pastas, etc.

Dough portion 12 may include ingredients found in typical dough products. For example, dough portion 12 may include flours such as wheat flour, corn flour, or multigrain flour, water, salt, sugar, oil, yeast, shortening, flavoring, baking powder, enzymes, etc. In an embodiment, dough portion 12 includes wheat flour, water, salt, sugar, oil, yeast and malted barley flour. The malted barley flour, however, is provided in dough portion 12 in an amount that is not typically used for dough products, as is discussed above. For example, in the present products, malted barley flour may be provided in an amount from about 0.5% to about 5.0%, or from about 1% to about 4%, or from about 2% to about 3%. In an embodiment, malted barley flour may be provided in an amount greater than about 1% to about 3%, or greater than about 1% to about 2.5%, or greater than about 1% to about 2%, or about 1.5%. In an embodiment, malted barley flour may be provided in an amount from about 1.5% to about 3%, or from about 1.5% to about 2.5%, or from about 1.5% to about 2%. In an embodiment, malted barley flour may be provided in an amount from about 2% to about 3%, or from about 2.5% to about 3%.

As discussed above, the use of increased amounts of malted barley flour provides several advantages for dough portion 12. For example, increased amounts of malted barley flour helps to provide a dough that has, and retains, a specific shape such as, for example, a regular or irregular shape (as shown in FIGS. 1 and 3), with an open cell structure (as shown in FIG. 2), and a variance in crust topography, or rim height, (as shown in FIG. 3). These attributes are more typical of dough that is minimally processed and that requires an extended fermentation time period (e.g., fermentation periods in excess of three hours) to achieve a "rustic" or "artisan" appearance. These attributes are typically achieved by hand-stretching dough one piece at a time. Because of the time and personal hand-stretching of these types of dough, they are not typically used in the market with high-speed manufacturing processes. Applicants have surprisingly found, however, that use of increased amounts of malted barley flour and specific processing steps can be used to created desired "artisan" attributes without the long fermentation times or hand-stretching of each individual dough product.

Indeed, the malted barley flour of the dough portion 12 also has high enzymatic activity that reacts at a rate that is much higher than is typically used in the baking industry. Using increased amounts of such malted barley flour, in combination with specific processing steps, which will be described in further detail below, creates dough that has an artisan appearance but can be made with high-speed industrial manufacturing equipment.

As mentioned above, dough portion 12 of dough-based product 10 may have an open cell structure that is typically found in high-quality, hand-made pizza dough. As used herein, "open cell structure" refers to voids or open cells in dough portion 12 that can affect the density and elasticity of dough portion 12 after baking. The voids or open cells inside dough portion 12 may form for different reasons, some of which include, for example, yeast inside the bread, which, when being made, can convert starches or carbohydrates in the dough to create air, or a pocket of air trapped within the bread. Open cell structure is captured visually as shown, for example, in FIG. 2, and in in-mouth texture by the term "aerated," which is defined as the amount of air in the product overall. The term "blisters" is sometimes used to refer to amounts of large air bubbles on the surface of products. Open cell structure of a dough-based product is also related to the density of the product, which is defined as the measure of the compactness of the product ranging from light/airy to compact/dense. Additionally, open cell structure may be discussed in terms of elasticity of the food product, or springiness of the product, which is the degree to which the product returns to its original shape after being compressed. The size and count of the individual air cells can be measured using known scanning equipment.

Returning now to FIGS. 1-3, dough-based product 10 may also include topping 14. Topping 14 may be any topping known in the industry including, but not limited to, of a sauce, a cheese, a vegetable, a meat, a fruit, a seafood, an herb, a spice, a nut, or combinations thereof. In an embodiment, topping 14 may be a fruit such as, for example, pineapple. If topping 14 is a sauce, the sauce may be selected from the group consisting of a tomato sauce, a mayonnaise, a hollandaise, a brown sauce, a velouté, a béchamel, or combinations thereof. Cheese toppings may include, for example, American, blue, brie, camembert, cheddar, colby, feta, goat, gorgonzola, manchego, mozzarella in its shredded and fresh forms, buffalo mozzarella, Parmesan, Pecorino Romano, provolone, ricotta, smoked Gouda, or combinations thereof. Vegetable toppings may include, for example, artichoke hearts, avocado, beans, black olives, broccoli, carrots, eggplant, green olives, green peppers, kalamata olives, jalapenos, mushrooms, onions, red peppers, roasted garlic, scallions, spinach, tomatoes, yellow peppers, zucchini, or combinations thereof. Meat toppings may include, for example, bacon, beef, chicken, chorizo, ham, pepperoni, prosciutto, salami, sausage, turkey, venison, or combinations thereof. Seafood toppings may include, for example, anchovies, crayfish, lobster, oysters, prawns, salmon, shrimp, tuna, or combinations thereof. Herb/spice toppings may include, for example, basil, bay leaf, cardamom, chili, chives, cilantro, coriander, cumin, garlic, oregano, parsley, pepper, rosemary, or combinations thereof. Nut toppings may include, for example, almonds, peanuts, pecans, pistachios, pine nuts, walnuts, or combinations thereof. The skilled artisan will appreciate, however, that the products of the present disclosure are not limited by the specific toppings to be included thereon.

Figure 4:
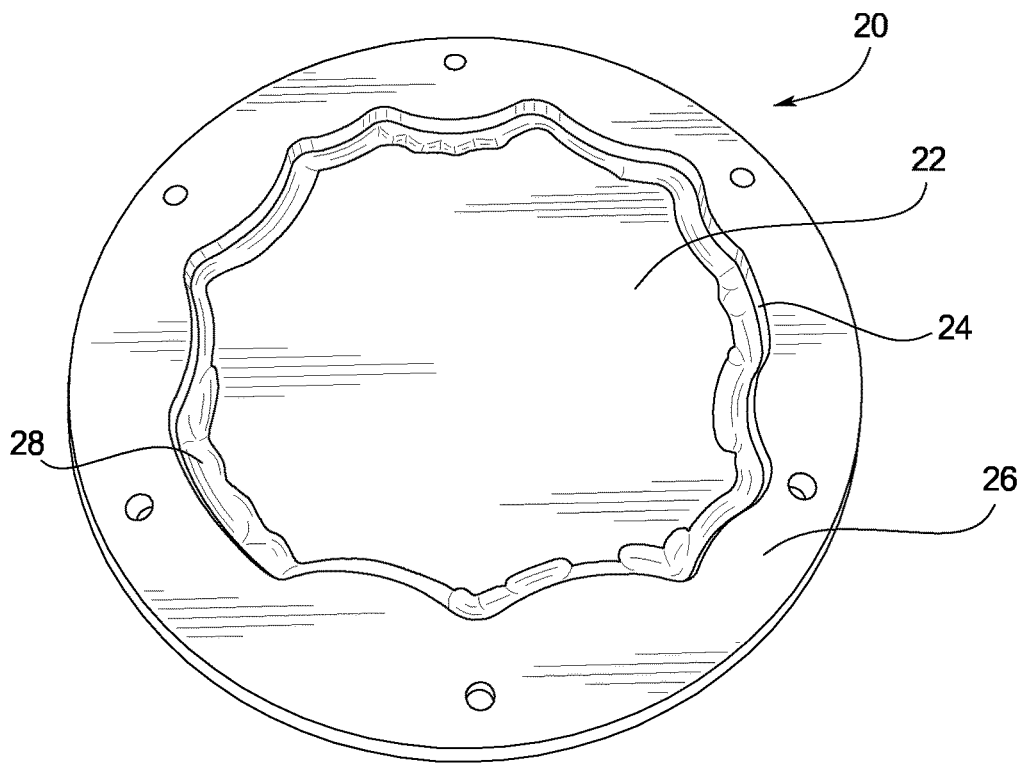
FIG. 4 shows a perspective view of a die press plate in accordance with an embodiment of the present disclosure.
Figure 5:
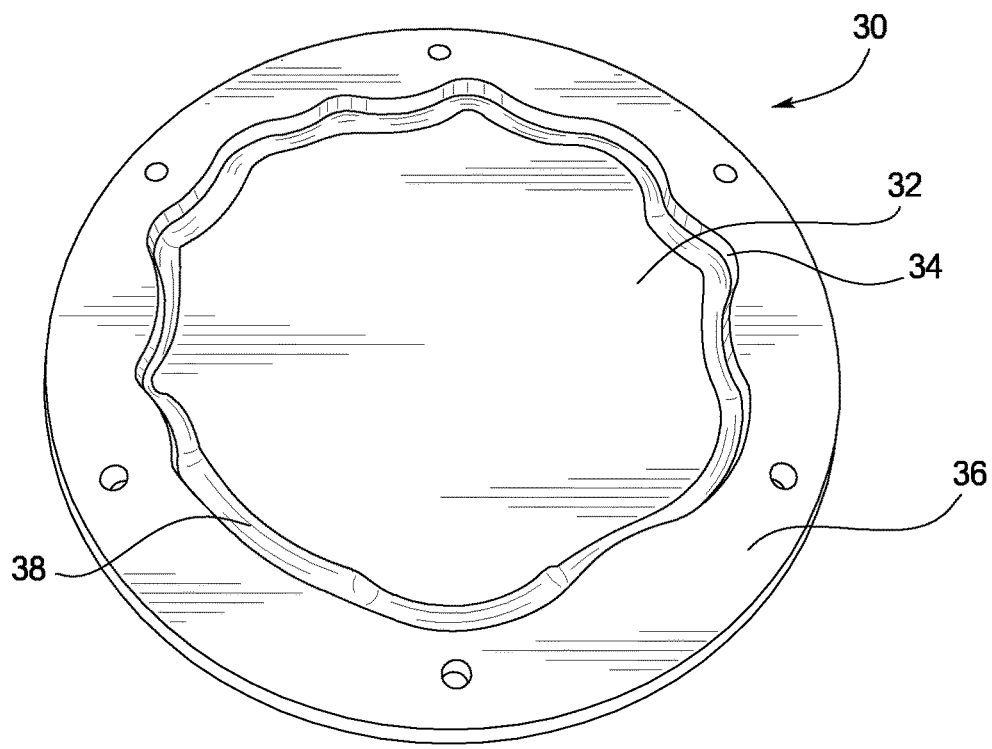
FIG. 5 shows a perspective view of a die press plate in accordance with an embodiment of the present disclosure.

As discussed above, the formulation of dough portion 12 with specific processing steps allows dough-based product 10 of the present disclosure to be par-baked in a typical impingement oven and still obtain rustic, artisan attributes that a are similar to pizzas baked in very high-heat hearth-style ovens. One of the unique processing steps of the present disclosure includes the use of specially designed die presses that are used to shape dough portion 12 of dough-based product 10. For example, FIGS. 4 and 5 show two different versions of die press plates that may be used to shape dough-based product 10. In an embodiment, die press plate 20 of FIG. 4 has a bottom portion 22, side walls 24 that extend substantially perpendicularly from bottom portion 22, and a flange, or lip, portion 26 that extends from an upper portion of side walls 24 in a direction that is substantially parallel to bottom portion 22. Bottom portion 22 and side walls 24 create an interior portion that is designed to accept dough portion 12 to shape and mold same. Flange, or lip, portion 26 may be used to attach die press plate 20 to another piece of manufacturing equipment, as would be appreciated by the skilled artisan.

As is clearly illustrated by FIG. 4, side walls 24 of die press plate 20 do not form a symmetrical shape. In other words, side walls 24 of die press plate 20 do not form a perfect circular shape that is generally associated with pizza products. Instead, side walls 24 of die press plate 20 have an irregular shape that creates a dough-based product 10 that is irregularly shaped. As mentioned above, "irregular shape" means a shape that is suggestive of a typical geometric shape (e.g., a circle, a square, a rectangle, an oval, etc.), but lacks symmetry such that the shape has imperfect and irregular lines. For example, as can be seen by FIG. 4, die press plate 20 has an irregular shape that closely mimics the shape of a circle. Thus, die press plate 20 can be said to have an irregular circle shape. Other irregular shapes may include, but are not limited to, an irregular square, an irregular rectangle, an irregular oval, etc.

FIG. 5 illustrates another example of a die press plate 30 that may be used to make dough-based product 10 of the present disclosure. Similar to die press plate 20, die press plate 30 includes a bottom portion 32, side walls 34 that extend substantially perpendicularly from bottom portion 32, and a flange, or lip, portion 36 that extends from an upper portion of side walls 34 in a direction that is substantially parallel to bottom portion 32. Bottom portion 32 and side walls 34 create an interior portion that is designed to accept dough portion 12 of dough-based product 10 to shape and mold dough portion 12. Flange, or lip, portion 36 may be used to attach die press plate 30 to another piece of manufacturing equipment. The primary difference between die press plate 20 of FIG. 4 and die press plate 30 of FIG. 5 is the shape of side walls 24, 34, respectively. Despite the fact that both side walls 24, 34 have irregular circle shapes, the irregular circle shapes of side walls 24, 34 are different. By providing not only irregularly shaped die press plates, but differently shaped die press plates, Applicants are able to provide pizza products having finished product shape variations despite the use of a fast-paced, large-scale production assembly.

Applicants are also able to provide pizza products having finished product shape variations such as, for example, an uneven or inconsistent crust rim height or topography, by providing recessed, or cut-away, portions near the bottom surfaces of the die press plates. For example, and as shown in FIG. 4, die press plate 20 may have a cut-away portion 28 located at an intersection of bottom portion 22 and side wall 24 such that cut-away portion 28 extends somewhat onto bottom portion 22, side wall 24, or combinations thereof. Cut-away portion 28 provides a general channel shape that allows more dough to be pressed into cut-away portion 28 such that when baked, the dough will rise and provide a higher area, or crust, on the outer edges of dough-based product 10 as compared to the flat, inner surface of bottom portion 22. The height of the crust, however, will vary depending on the varied shape and depth of the cut-away portion 28 around a perimeter of same. For example, cut-away portion 28 may have different shapes and depths following the circumference of side walls 24. These variations in shape and depth provide similar variations in shape and depth (e.g., height) of the crust once the dough that is pressed into die press plate 20 is baked.

As shown in FIG. 5, a similar cut-away portion 38 is provided that affords similar advantages to a dough that is pressed with die press plate 30 (e.g., variations in crust height and shape). The skilled artisan will appreciate that cut-away portions 28, 38 may be formed into die press plates 20, 30 using any known methods. Cut-away portions 28, 38 may be formed, for example, by milling, grinding, rabbetting, routing, and other suitable machining processes.

In use, die press plates 20, 30 may be pressed downward onto, or "stamp," a dough product resting on a flat conveyor belt. The die press plates 20, 30 are pressed onto a top of a dough product under a high pressure of about 400-1000 psi. As mentioned above, cut-away portion 28, 38 provides a general channel shape that allows more dough to be pressed into cut-away portion 28, 38 such that when baked, the dough will rise and provide a higher area, or crust, on the outer edges of dough-based product 10 as compared to the flat, inner surface of bottom portion 22. There may also be a heated plate under the belt to keep the dough warm and moist.

In view of the manner in which the die press plates 20, 30 are used, the skilled artisan will appreciate that bottom 22 of die press plate 20 is actually a top of die press plate 20 when in use. The same applies for bottom 32 of die press plate 30. In other words, FIGS. 4-5 are illustrated to show bottom portions of die press plates 20, 30 that actually contact a top portion of the dough products of the present disclosure to "stamp" a shape into the dough products as they rest on a conveyor belt.

In addition to the use of unique die press plates, other processing parameters can offer advantageous characteristics to the products of the present disclosure. For example, as mentioned above, the dough of the present disclosure does not require extended fermentation times typical of known frozen pizzas (e.g., at least three hours). Instead, the dough of the present disclosure may be fermented (e.g., lay time) for a period of time from about 60 to about 120 minutes, or about 90 minutes, which is much less than the typical fermentation time of at least three hours. Indeed, some prior art processes require fermentation times of up to 8 to 24 hours. During lay time or fermentation time of the dough, the dough may rest in an environment having a temperature from about 60° F. to about 90° F., or from about 70° F. to about 80° F., or about 75° F.

Additionally, the products of the present disclosure need not be baked in a specialty oven (e.g., hearth-stone, wood-fired, coal-fired, dome-shaped, etc.), but rather are baked in an open oven chamber such as, for example, an impingement oven. The products may be baked at an oven temperature between about 500° F. and about 800° F. In an embodiment, the products may be baked at an oven temperature of about 550° F., 600° F., 650° F., 700° F., or 750° F. Therefore, the skilled artisan will appreciate that the temperature refers to the temperature in the oven, and not the temperature of the dough product.

Further, prior art pizza dough usually requires the sprinkling of breadcrumbs or cornmeal to the sheeted dough product. However, the dough of the present disclosure does not require application of breadcrumbs or cornmeal to a sheet of dough. This reduces the costs associated with production, while also reducing the amount of time required to prepare a final product. However, either of these products, or any functionally similar products may be used in the present processes if desired.

Additional processing steps may also be used in the present processes. For example, the dough of the present disclosure may be sized at some point in the processing steps. As used herein, "sizing" the dough refers to a process by which a large body of dough is formed into at least two smaller dough bodies that may be pressed by a die press to form a final dough piece for baking. Different "sizing" processes that may be used in the present processing steps include, but are not limited to, sheeting, dividing a dough mass into dough balls, cutting a dough mass, dividing a dough mass into a plurality of pieces, etc.

The dough of the present disclosure may also be proofed during processing. The dough may be proofed at a temperature from about 80° F. to about 120° F., or from about 90° F. to about 110° F., or at about 100° F. The proofing may be for an amount of time from about 10 to about 40 minutes, or from about 20 to 30 minutes, or about 25 minutes. Further, the proofing may be performed at a relative humidity from about 30% to about 60%, or from about 40% to about 50%, or about 45%.

By way of example and not limitation, the following examples are illustrative of various embodiments of the present disclosure. The formulations and processes below are provided for exemplification only, and they can be modified by the skilled artisan to the necessary extent, depending on the special features that are desired.

EXAMPLE 1

Comparison of a Standard Pizza Dough Formulation to a Pizza Dough Formulated According to the Present Disclosure Table 1 below shows an example of a standard pizza dough formulation. See, Baking Science and Technology Volume II by E. J. Pyler and L. A. Gorton (Sosland Publishing).

TABLE 1

Standard Pizza Dough Formulation

| Ingredient | % Flour Weight |
| --- | --- |
| Flour | 100 |
| Water | 55.0-70.0 |

TABLE 1-continued

Standard Pizza Dough Formulation

| | % Flour Weight |
| --- | --- |
| Salt | 1.0-2.0 |
| Sugar | 1.0-5.0 |
| Shortening | 3.0-5.0 |
| Yeast | 0.5-5.0 |
| Baking Powder (in place of yeast) | 0.5-4.0 |
| Calcium Propionate | 0.1-0.3 |
| w/Optional Ingredients | |
| Proteolytic enzyme | As recommended |
| L-cysteine | 45.0-90.0 ppm |
| Corn Meal | 10.0-20.0% Flour Weight |
| Flavoring | As desired |
| Sours | 1.0-3.0% Flour Weight |
| Vinegar (200 grain) | 0.5-1.0% Flour Weight |
| Sodium Stearoyl Lacylate | 0.25-0.5% Flour Weight |
| Vital Wheat Gluten | 1.0-2.0% Flour Weight |

As is shown in Table 1, standard pizza dough formulations can include many different types of ingredients. In contrast, however, simpler pizza dough recipes are also known and include fewer amounts of ingredients including, for example, flour, water, salt, yeast and, optionally, sugar. An example of such a simple type of pizza dough is used by the highly regarded Chef Peter Reinhart and/or Alton Brown. Applicants are unaware of the precise percentages of ingredients used to create such pizza dough formulations.

Table 2 below illustrates a sample formulation for a pizza dough of the present disclosure. In contrast to the above-mentioned standard pizza dough formulations, the dough formulations of the present disclosure include malted barley flour in amounts from about 0.5% to about 3.0%, which is greater than the amounts of malted barley flour used in known pizza dough formulations. In an embodiment, a sample formulation includes about 1.5% malted barley flour. As mentioned above, the use of malted barley flour in increased amounts provides a pizza dough that is able to, for example, retain a given, specific shape, provide variations in crust height and thickness, and provide uneven, open-cell structure.

TABLE 2

Example Pizza Dough Formulation of the Present Disclosure (in Baker's percentages based on flour weight).

| Ingredient | Percentages |
| --- | --- |
| Wheat Flour | 100% |
| Water | 55%-70% |
| Salt | 1-2.5% |
| Sugar | 0-4% |
| Malted Flour | 0.5-3.0% |
| Oil | 1%-6% |
| Yeast | 0.5-3% |

EXAMPLE 2

Comparison of a Standard Pizza Dough Process to a Pizza Dough Process According to the Present Disclosure Pizzeria Process of Making Pizza An example of a standard pizzeria process for making pizza is as follows: (1) mix dough ingredients; (2) allow dough to bulk ferment for 8-24 hours (typically moved to cooler temperature after 30-60 minutes), or cut dough into doughballs—allow to ferment for 8-24 hours; (3) allow dough balls to reach room temperature; (4) hand-toss/press pizza dough to desired thickness and shape; (5) top dough with topping ingredients; and (6) transfer pizza to an oven that is heated to a temperature from about 600° F. to about 1000° F. Some pizzeria processes may also include a second rest period after dividing or pressing the dough.

Typical Large Scale Frozen Pizza Operation

An example of a typical large scale frozen pizza-making process is as follows: (1) mix dough; (2) (optionally) allow lay-time for dough conditioning and flavor development; (3) divide dough into dough balls, or sheet dough thin using rollers and cut to size or into dough billet; (4) proofing/resting; (5) dough press; (6) crust is baked or dough is frozen directly.

Process According to the Present Disclosure

An example of a process for making pizza products of the present disclosure is as follows: (1) mix dough having a higher level of malt flour containing enzymes; (2) allow 60-90 minutes lay time/fermentation time at a temperature from about 70° F. to about 80° F.; (3) sheet dough into dough billet; (4) proof dough at a temperature of about 100° F. for about 20 to about 30 minutes at a relative humidity from about 40% to about 50%; (5) press dough using a unique die having an irregular shape, or a channel formed therein around a bottom perimeter of the die; (6) apply light dusting flour; and (7) oven bake at a temperature between about 500° F. and about 800° F., or about 600° F. The skilled artisan will appreciate, however, that the process according to the present disclosure is just one embodiment of a process used to make products of the present disclosure and that the exemplary steps set forth in this Example may be modified without departing from the intended advantages of the processes set forth herein.

By using a process that is similar to the process set forth in this Example, Applicants are able to provide a rustic, artisan pizza that exhibits characteristics of a pizza that would otherwise require a much longer process to create, as well as much more intricate processing equipment. Indeed, the combination of the present dough formulations and processing parameters can provide a pizza product that appears to be hand-made using a unique oven (e.g., hearthstone, wood-fired, coal-fired, dome-shaped, etc.) and a long dough fermentation time, but yet is produced using a high-speed, automated process. As such, the dough products of the present disclosure provide several advantages over dough products currently on the market.

Aspects of the Present Disclosure

Aspects of the subject matter described herein may be useful alone or in combination one or more other aspect described herein. Without limiting the foregoing description, in a first aspect of the present disclosure, a pizza dough includes malted barley flour in an amount greater than 1.0% to about 3.0% by flour weight.

In accordance with a second aspect of the present disclosure, which may be used in combination with the first aspect, the pizza dough includes malted barley flour in an amount from about 1.5% to about 2.5%.

In accordance with a third aspect of the present disclosure, which may be used in combination with any one or more of the preceding aspects, the pizza dough includes malted barley flour in an amount of about 1.5% by flour weight.

In accordance with a fourth aspect of the present disclosure, which may be used in combination with any one or more of the preceding aspects, the pizza dough further includes at least one ingredient selected from the group consisting of flour, water, salt, sugar, yeast, or combinations thereof.

In accordance with a fifth aspect of the present disclosure, which may be used in combination with any one or more of the preceding aspects, a pizza product includes a dough comprising malted barley flour in an amount greater than 1.0% to about 3% by flour weight of the dough product, the dough having a characteristic selected from the group consisting of a regular shape, an irregular shape, an uneven topography around an outer, top portion of the dough, an open cell structure, or combinations thereof.

In accordance with a sixth aspect of the present disclosure, which may be used in combination with any one or more of the preceding aspects in combination with the fifth aspect, the pizza product may also include at least one topping on the dough.

In accordance with a seventh aspect of the present disclosure, which may be used in combination with any one or more of the preceding aspects in combination with the fifth aspect, the pizza product includes malted barley flour in an amount from about 1.5% to about 2.5%.

In accordance with an eighth aspect of the present disclosure, which may be used with any one or more of the preceding aspects in combination with the fifth aspect, the dough includes malted barley flour in an amount of about 1.5%.

In accordance with a ninth aspect of the present disclosure, which may be used with any one or more of the preceding aspects in combination with the fifth aspect, the dough further includes at least one ingredient selected from the group consisting of flour, water, salt, sugar, yeast, or combinations thereof.

In accordance with an tenth aspect of the present disclosure, which may be used with any one or more of the preceding aspects in combination with the fifth aspect, the at least one topping is selected from the group consisting of a sauce, a cheese, a vegetable, a meat, a fruit, a seafood, an herb, a spice, a nut, or combinations thereof.

In accordance with a eleventh aspect of the present disclosure, which may be used in combination with any one or more of the preceding aspects in combination with the fifth aspect, the pizza product is a frozen pizza.

In accordance with a twelfth aspect of the present disclosure, which may be used with any one or more of the preceding aspects, a method of making a dough-based food product includes mixing a dough having malted barley flour in an amount greater than 1% to about 3.0% by flour weight, fermenting the dough, pressing the dough with a die having a characteristic selected from the group consisting a regular shape, an irregular shape, a channel formed along a bottom perimeter of the die, or combinations thereof, and baking the dough to form the dough-based food product.

In accordance with an thirteenth aspect of the present disclosure, which may be used with any one or more of the preceding aspects in combination with the twelfth aspect, the method further includes adding at least one topping to the pressed dough, the topping selected from the group consisting of a sauce, a cheese, a vegetable, a meat, a fruit, a seafood, an herb, a spice, a nut, or combinations thereof.

In accordance with an fourteenth aspect of the present disclosure, which may be used with any one or more of the preceding aspects in combination with the twelfth aspect, the dough includes malted barley flour in an amount from about 1.5% to about 2.5%.

In accordance with a fifteenth aspect of the present disclosure, which may be used with any one or more of the preceding aspects in combination with the twelfth aspect, the dough is fermented for an amount of time from about 60 minutes to about 120 minutes.

In accordance with a sixteenth aspect of the present disclosure, which may be used in combination with any one or more of the preceding aspects in combination with the twelfth aspect, the dough is fermented for about 90 minutes.

In accordance with a seventeenth aspect of the present disclosure, which may be used with in combination with any one or more of the preceding aspects in combination with the twelfth aspect, the dough is baked at an oven temperature from about 500° F. to about 800° F.

In accordance with a eighteenth aspect of the present disclosure, which may be used with any one or more of the preceding aspects in combination with the twelfth aspect, the dough is baked at an oven temperature of about 600° F.

In accordance with a nineteenth aspect of the present disclosure, which may be used with any one or more of the preceding aspects in combination with the twelfth aspect, the method further includes at least one step selected from the group consisting of sizing the dough into a dough billet after fermenting the dough, proofing the dough after sizing the dough, applying a dusting flour to the dough after pressing the dough, packaging the dough-based food product, or combinations thereof.

In accordance with a twentieth aspect of the present disclosure, which may be used with any one or more of the preceding aspects in combination with the twelfth aspect, the irregular shape is selected from the group consisting of an irregular circle, an irregular oval, an irregular square, an irregular rectangle, or combinations thereof.

In accordance with a twenty-first aspect of the present disclosure, which may be used with in combination with any one or more of the preceding aspects in combination with the twelfth aspect, the dough-based product has an irregular shape and an open cell structure.

In accordance with a twenty-second aspect of the present disclosure, which may be used with in combination with any one or more of the preceding aspects in combination with the twelfth aspect, the dough-based food product is a frozen pizza product.

In accordance with a twenty-third aspect of the present disclosure, which may be used with any one or more of the preceding aspects, a method of making a dough-based food product includes preparing a dough having malted barley flour, fermenting the dough for an amount of time that is less than three hours, pressing the dough with a die having a characteristic selected from the group consisting a regular shape, an irregular shape, a channel formed along a bottom perimeter of the die, or combinations thereof, and baking the dough to form the dough-based food product.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of making a dough-based food product, the method comprising:
   mixing a dough having malted barley flour in an amount of 1.5% to 2.0% by flour weight;
   fermenting the dough;
   pressing the dough with a die having a characteristic selected from the group consisting of a regular shape, an irregular shape, a channel formed along a bottom perimeter of the die, and combinations thereof; and
   baking the dough to form the dough-based food product.

2. The method according to claim 1, wherein the dough is fermented for about 60 minutes to about 120 minutes.

3. The method according to claim 1, wherein the dough is baked at an oven temperature of about 500° F. to about 800° F.

4. The method according to claim 1 comprising at least one step selected from the group consisting of sizing the dough into a dough billet after fermenting the dough, proofing the dough after sizing the dough, applying a dusting flour to the dough after pressing the dough, packaging the dough-based food product, and combinations thereof.

5. The method according to claim 1, wherein the irregular shape is selected from the group consisting of an irregular circle, an irregular oval, an irregular square, an irregular rectangle, and combinations thereof.

6. The method according to claim 1, wherein the dough-based product has an irregular shape and an open cell structure.

7. A method of making a frozen pizza, the method comprising:
   preparing a dough comprising malted barley flour in an amount of 1.5% to 2.0% by flour weight;
   fermenting the dough for an amount of time that is less than 3 hours;
   pressing the dough with a die having a characteristic selected from the group consisting of a regular shape, an irregular shape, a channel formed along a bottom perimeter of the die, and combinations thereof;
   adding a topping to the pressed dough, the topping selected from the group consisting of a sauce, a cheese, a vegetable, a meat, a fruit, a seafood, an herb, a spice, a nut, and combinations thereof;
   baking the dough with the topping thereon to form a par-baked pizza; and
   freezing the par-baked pizza to form the frozen pizza.

8. The method according to claim 1, wherein the die has an irregular shape.

9. The method according to claim 7, wherein the die has an irregular shape.

* * * * *